3,851,071
STERILE EFFERVESCENT BEVERAGE AND PROCESS FOR PREPARING SAME

Paul G. Roehrig, Northridge, Nicholas C. Pappas, Van Nuys, and Robert E. Durbin, Saugus, Calif., assignors to Carnation Company, Los Angeles, Calif.
No Drawing. Continuation-in-part of abandoned application Ser. No. 34,512, May 4, 1970. This application June 28, 1973, Ser. No. 374,618
Int. Cl. A23l 1/00, 3/00
U.S. Cl. 426—190    14 Claims

ABSTRACT OF THE DISCLOSURE

A sterile effervescent beverage is provided by preparing a sterile syrup phase comprising a homogeneous mixture of protein, fat, carbohydrate and water, separately preparing a sterile aerated aqueous phase, introducing said syrup phase and said aerated aqueous phase under sterile conditions into a sterile container and sealing the container under sterile conditions.

RELATED APPLICATIONS

This application is a continuation-in-part of copending application Ser. No. 34,512, filed May 4, 1970 for Sterile Effervescent Beverage, now abandoned.

BACKGROUND OF THE INVENTION (1) Field of Invention

This invention relates to a sterile effervescent beverage and the process for producing such a product. More particularly, the invention relates to a process for preparing a sterile, flavored beverage containing a volatile edible gas and having a desirable flavor and excellent storage stability.

(2) Description of Prior Art

The preparation of sterile aerated beverages, such as carbonated milk-based beverages, in the same general manner in which conventional carbonated beverages, such as gingerales, colas and fruit-flavored carbonated beverages are prepared, has been attempted on numerous occasions in the past. However, such prior attempts have not been commercially successful. This lack of commercial success in producing a sterile effervescent beverage has been due largely to the fact that the beverage has usually been subjected to high temperature processing in order to provide a sterile product.

Thus, attempts to sterilize the effervescent beverage in a closed container, such as by retorting at high temperatures for extended periods of time have been unsuccessful due to the excessively high pressure build-up in the container during heat processing. The build-up of such high pressure in the sealed container causes the container to rupture and results in a loss of gas therefrom. The resulting product has little or no effervesence and an undesirable cooked flavor. Attempts to sterilize such an effervescent beverage by high temperature treatment prior to introducing the beverage into containers have also been unsuccessful due to the loss of gas from the beverage caused by heat processing. The resulting product contains an insufficient amount of effervescence and lacks a desirable effervescent taste and flavor. In addition, the literature has suggested that beverages containing particulate matter such as milk solids cannot be efficiently aerated due to the rapid loss of the volatile gas in the presence of such particles.

SUMMARY OF THE INVENTION

It has been discovered that a sterile effervescent beverage having a desirable flavor and excellent storage stability can be prepared by a three stage process involving two separate phases. Thus, an aerated aqueous phase containing a volatile edible gas and a syrup phase are separately prepared, sterilized and cooled and these two sterile phases are then introduced into sterile containers in an aseptic canning operation. The sealed containers are agitated to disperse the syrup phase throughout the aerated aqueous phase and provide a homogeneous product.

Since both the aerated aqueous phase and the syrup phase are sterile when combined under aseptic conditions in the sterile container, no subsequent high temperature heat treatment of the aerated product is necessary to provide a sterile product. As a result, the aerated beverage is not subjected to conditions which adversely affect the degree of aeration or the taste and flavor of the product.

DESCRIPTION OF PREFERRED EMBODIMENTS

According to the present invention, the aerated aqueous phase is prepared by contacting an aqueous liquid, such as water, which is substantially free of solid particulate matter, with a volatile edible gas under conditions sufficien to dissolve at least a portion of the gas in the aqueous liquid. Any volatile gas suitable for use in food or beverage products and which is at least slightly soluble in water may be used. Such volatile edible gases include, for example, fluorocarbon gases such as trichlorofluoromethane, dichlorodifluoromethane, chlorotrifluoromethane, tetrafluoromethane, and trifluoromethane, carbond dioxide, nitrous oxide, and the like and mixtures thereof. Preferably, carbon dioxide is used as the volatile edible gas for it is readily available and provides the product with a desirable tangy taste.

The amount of gas dissolved in the aqueous liquid should be sufficient to provide an effervescent beverage. This amount will, of course, depend on the type of gas used. Since the degree of aeration of the aqueous liquid is dependent on a number of factors such as the temperature of the aqueous liquid, the pressure of the gas, the length of contact time and the nature of the contact time between the gas and the aqueous liquid, the conditions of aeration may be subject to wide variation.

Generally, it is preferred to aerate the aqueous liquid by injecting the gas, under pressure, into the liquid. Other suitable techniques for aerating the aqueous liquid may, of course, also be employed. For example, saturators may be used in which the liquid in the form of small droplets or thin sheets is passed through an atmosphere of the gas to be dissolved therein. By controlling the temperature of the aqueous liquid, the pressure of the gas, the contact time, and the opportunity for intimate contact, the desired degree of aeration may be obtained. The aqueous liquid may also be aerated by liquifying or solidifying the edible gas and contacting the aqueous liquid with the liquified or solidified gas.

The aerated aqueous phase must be sterile at the time it is introduced into the sterile containers in the filling operation. The aqueous liquid and the gas may both be sterile when the gas is contacted with and dissolved in the liquid in the preparation of the aerated aqueous phase. Thus, the aqueous liquid, such as water, and the gas may be sterilized prior to aeration by any suitable technique such as high temperature treatment, exposure to ultraviolet rays or other types of radiation, sonic vibration, ultrafiltration and the like. For example, carbon dioxide obtained from commercially available cylinders or tanks may be sterilized by ultrafiltration such as by passing the gas through a microbiological ultrafilter. The presterilized aqueous liquid and gas are then contacted under sterile conditions to form the aerated aqueous phase.

When the aqueous liquid or gas are not sterile at the time the liquid is aerated, sterilization of the liquid may be effected by any suitable technique which does not cause the release of excessive amounts of gas from the liquid, such as by exposure to ultraviolet rays, sonic vibration, ultrafiltration, and the like.

When carbon dioxide is used as the gas and water is used as the liquid in forming an aerated water phase, it is advantageous to cool the water prior to contact with the carbon dioxide for the solubility of carbon dioxide in water is greater at colder temperatures. Generally, the water is below about 60° F. and preferably about 45° F. or below when it is contacted with the carbon dioxide. According to a preferred embodiment, carbonation of the water is effected by injecting sterile carbon dioxide gas, at a pressure of at least about 40 p.s.i., into cool sterile water flowing through sterile pipes. The combination of large surface exposure of water, provided by the flowing water, and the relatively high pressure of carbon dioxide facilitates quick absorption of the carbon dioxide into the water.

The aerated aqueous phase is maintained at a temperature below about 55° F. and preferably below about 45° F. until it is introduced into containers, in order to facilitate absorption and retention of the gas in the liquid. The cool sterile aerated aqueous phase is passed through sterile lines for filling into the sterile containers in an aseptic canning operation. Suitable pressure reduction means may be installed in the sterile lines prior to the point at which the sterile aerated aqueous phase is discharged into the containers.

The syrup phase comprises a homogeneous aqueous mixture of carbohydrates, fat and protein. The carbohydrate provides the beverage with desired sweetness and body. Sugars such as sucrose, dextrose, fructose, lactose, maltose, invert sugar and the like and mixtures thereof generally are used. The amount of carbohydrate contained in the syrup phase should be sufficient to provide a desired sweetness in the finished product and may range from a trace up to about 15 percent by weight of the beverage.

The fat included in the syrup phase may be any of the natural animal or vegetable fats or oils commonly used in foods or beverages and may be used in the beverage of the present invention. For example, unsaturated or fully or partially hydrogenated fats and oils such as milk fat, coconut oil, palm kernel oil, tacum nut oil, babassu nut oil, cottonseed oil, soybean oil, safflower oil, peanut oil, corn oil, and the like and mixtures thereof may be included in the syrup phase.

The protein which is included in the syrup phase may be any of a large group including milk solids non-fat, water soluble soy protein derivatives, sodium caseinate, calcium caseinate, egg albumen, gelatin and the like and mixtures thereof. It is believed that the protein serves to effect stability and flavor of the aerated beverage.

Advantageously, the syrup phase may include one or more of the following materials: a flavoring agent, a colorant, a salt, an emulsifier, a stabilizer and an acidulant. Both natural and synthetic flavoring agents may be used, such as vanilla, cocoa, chocolate, root beer, butterscotch, maple and fruit flavors. Acidulants are advantageously included to reduce the pH of the beverage and to enhance the flavor of the beverage. The amount of acidulant included in the syrup phase should be sufficient to provide the aerated beverage with a pH of below about 6.4 and preferably between about 5.2 and 5.8. Acidulants which may be used include organic and inorganic acids such as citric, phosphoric, carbonic, tartaric, lactic, malic, fumaric, or adipic acids and the like and mixtures thereof. Salts which may be used include the chloride, phosphate and citrate salts of sodium, potassium, calcium and magnesium such as sodium chloride, potassium chloride, potassium citrate, sodium citrate, calcium citrate, magnesium citrate, di- and tricalcium phosphate and the like and mixtures thereof.

A wide variety of emulsifiers may be used in the syrup phase. Thus, hydroxylated lecithin, mono or diglycerides of fatty acids such as monostearin and dipalmitin, polyoxyalkylene ethers of fatty esters of polyhydric alcohols such as the polyoxyethylene ethers of sorbitan monostearate or the polyoxyethylene ethers of sorbitan distearate; fatty esters of polyhydric alcohols, such as sorbitan monostearate; mono and di-esters of glycols and fatty acids such as propylene glycol monostearate and propylene glycol monopalmitate; and partial esters of carboxylic acids such as lactic, citric, and tartaric acids with the mono and diglycerides of fatty acids such as glyceryl lactopalmitate and glyceryl lactooleate. The fatty acids employed in the preparation of the emulsifiers include those derived from beef tallow and coconut, cottonseed, palm, peanut, soybean and marine oils. Preferably, a combination of emulsifiers is employed, typically, polyoxyethylene sorbitan monostearate and sorbitan monostearate.

Stabilizers, other than protein, which may also be included in the syrup phase include natural or synthetic gums such as carrageenan, guar gum, gum arabic, gum tragacanth, alginate, carboxymethylcellulose, methylcellulose-ether, and the like and mixtures thereof.

The incorporation of fat, protein, emulsifier and stabilizer in the product provides a product having a creamy mouth feel, and promotes the physical stability of the product so that the beverage remains substantially homogeneous even after prolonged storage periods. While the amounts of these materials may be varied over relatively wide limits, the amount of protein or other buffering components in the beverage should not be so great as to impart an undesirable flavor thereto. Generally, the amounts of fat, protein, emulsifier or stabilizer which may be included in the syrup phase are sufficient to provide the aerated beverage with a fat content of up to about 10% by weight, up to about 5% by weight protein, and up to about 1% by weight each of emulsifier and stabilizer.

The syrup phase is advantageously prepared by blending the ingredients, including carbohydrate, fat and protein, with water to form a mix, homogenizing the mix to form an emulsion, sterilizing the emulsion and aseptically cooling the sterile emulsion to provide the cold sterile syrup phase. In preparing the syrup phase, the ingredients, including salt, flavoring, coloring and acidulant, are mixed with an amount of water sufficient to provide a blend having a solids content of between about 25% and 75% and preferably between about 40% and 65% by weight.

The syrup phase is sterilized by any technique capable of rendering the syrup free from living microorganisms, such as by a high-temperature, short-time sterilization treatment in which the aqueous solution is heated to a temperature in the range of 260° F.–300° F. for a time within the range of a fraction of a second up to five minutes or more. Following sterilization, the syrup phase is preferably cooled in suitable sterile heat exchange equipment. It has been found that cooling the sterile syrup phase minimizes the loss of gas from the cool aerated aqueous phase when the two phases are combined in the canning operation. Generally, the syrup phase is cooled to at least about the temperature of the aerated aqueous phase and preferably is cooled to between about 15° F. to 30° F. to provide a cold syrup phase.

Since protein is included in the syrup phase, it is generally preferred to forewarm the blend of ingredients prior to sterilization, such as by heating the emulsion to a temperature of about 140° F. to 260° F. for a period of from a few seconds to a few minutes.

The cold sterile syrup phase is combined with the cool sterile aerated aqueous phase in an aseptic canning operation in which the separate phases are filled into presterilized containers in a sterile atmosphere and the filled containers are sealed with sterile covers while still in the sterile atmosphere.

If the containers are presterilized by heat treatment, it is advantageous to reduce the temperature of the sterile containers to below about 100° F. by any suitable means, such as by quenching with cool, sterile water, prior to introduction of the aerated aqueous phase. Reducing the temperature of the containers in this manner aids in minimizing the loss of gas from the aerated aqueous phase when that phase is filled into the containers.

The filling chamber, in which the sterile phases are combined in the sterile containers, is presterilized by any conventional technique, such as the use of high temperature steam. The filling chamber may be at an elevated temperature, that is, about 250-300° F. when the sterile aqueous phase and the sterile syrup phase are filled into the containers. However, it is preferred to maintain the temperature of the filling chamber below about 150° F. and preferably below about 100° F. when the sterile phases are filled into the containers in order to minimize loss of gas from the aerated liquid phase. According to one embodiment of the invention, a cool sterile gas, such as nitrogen, carbon dioxide, air, or the like is passed through the sterile filling chamber to effect such a reduction in the temperature of the filling chamber. Such cool sterile gas may be supplied to the sterile filling chamber by any suitable technique. For example, heat sterilized air may be contacted with cooling coils, cooling ducts and the like, and passed through the filling chamber. According to a preferred embodiment, ambient air is refrigerated to a temperature of about 30° F. to 60° F. and then sterilized, such as by ultrafiltration using a microboliogical filter. The cool sterile air is continuously passed through the filling chamber and vented therefrom.

The amounts of syrup phase and the aerated aqueous phase introduced into the containers should be controlled to provide an aerated beverage having a solids content of between about 5% and 25% by weight, preferably between about 10% and 20%. Although the viscous syrup phase may be placed in the sterile containers prior to or simultaneously with the introduction of the aerated aqueous phase, it is preferred to first introduce the aerated aqueous phase into the containers and then add the syrup in order to reduce the loss of gas from the aqueous phase during the filling operation.

The filled containers are hermetically sealed while in the sterile atmosphere and then warmed to room temperature or above, such as by contacting the containers with a warm water spray or bath, to prevent sweating after casing and to facilitate dispersion of the syrup in the aqueous phase. The warmed containers are agitated such as by rolling the containers to thoroughly disperse the syrup in the aqueous phase and provide a homogeneous beverage.

The product thus prepared has a pH of below about 6.4, and preferably between about 5.2 and 5.8, so that the beverage has a desirable sharp flavor or "bite." The volume of edible gas contained in the product will of course depend upon the type of gas used. When carbon dioxide is employed as the volatile edible gas, it should be present in the product in amounts between about 1.5 and 4.5, and preferably between 2.0 and 3.0 volumes of carbon dioxide in order to impart a tangy taste to the beverage. When a volatile edible gas other than carbon dioxide is used, it should be present in an amount sufficient to provide an effervescent beverage. The product of the present invention has excellent storage stability, there being substantially no deterioration of the product or separation of the phases over prolonged periods of storage of up to six months or more.

The following examples are given in order to illustrate the present invention, but in no manner to restrict it.

EXAMPLE I

A sterile, aerated beverage is prepared according to the procedure described below, the beverage having the following formulation.

| Ingredients: | Percent by weight |
|---|---|
| Fat (hydrogenated vegetable) | 1.00 |
| Milk solids, nonfat | 2.00 |
| Carbohydrate (sugar) | 10.70 |
| Protein (sodium caseinate) | .20 |
| Stabilizer (carrageenan) | 0.15 |
| Emulsifier (polyoxyethylene [20] sorbitan monostearate) | 0.20 |
| Emulsifier (sorbitan monostearate) | 0.10 |
| Colorant (caramel) | 0.37 |
| Flavor (root beer) | 0.02 |
| Salt (sodium chloride) | 0.05 |
| Salt (sodium citrate) | 0.20 |
| Water | 85.01 |

A syrup phase is prepared by heating to about 175° F.–185° F. an amount of water sufficient to provide a syrup phase having a solids content of about 50 percent. The sugar, stabilizer, sodium chloride, sodium citrate, milk solids nonfat, and sodium caseinate are added to the water with mixing. The fat and the emulsifiers are blended at about 150° F.–165° F. and added to the water with mixing, followed by the addition of the flavor and colorant. The mix thus formed is forewarmed at 250° F. for two minutes, deaerated and passed, at a temperature of about 150° F. to 160° F. through a two stage homogenizer, the first stage being operated at 2000 p.s.i. and the second stage at 500 p.s.i. The homogenized mix is sterilized by heating to about 280° F. for 10–15 seconds, and is passed through sterile lines and cooled to about 250° F. by heat exchange. The cold syrup is then pumped to the filling chamber of an aseptic canning unit.

In preparing the aerated aqueous phase, a supply of distilled water is deaerated and sterilized by high temperature treatment. The sterile water is then passed through sterile lines and cooled by heat exchange to about 35° F.–40° F. Carbon dioxide, obtained from commercially available $CO_2$ cylinders is passed through a microbiological filter of a size sufficient to render the gas free from living microorganisms so that the gas is sterile. The sterile gas is then sparged into the sterile lines carrying the sterile water to dissolve in the water at least about 4.0 volumes of carbon dioxide. The sterile carbonated water is maintained at a temperature of about 40° F. and is passed to the filling chamber of the aseptic canning unit.

The temperature of the filling chamber of the canning unit is maintained at about 60° F.–70° F. by passing cold sterile air through the chamber which is presterilized by the use of the high-temperature steam. A stream of cool sterile water is sprayed on the outside of the presterilized containers as they pass from the sterilizing chamber to the filling chamber of the canning unit in order to reduce the temperature of the containers to about 100° F. A metered amount of the sterile carbonated water is filled into the presterilized containers followed by the addition of a metered amount of the sterile syrup. The amounts of carbonated water and syrup filled into the containers are controlled to provide a carbonated beverage having a solids content of about 15 percent. The cans are hermetically sealed under sterile conditions, warmed by immersion in a 100° F. water bath for about 2–3 minutes and rolled to mix the product.

EXAMPLE II

A sterile carbonated beverage is prepared according to the procedure of Example I with the exception that the carbonated water phase is prepared by using solidified carbon dioxide (Dry Ice) as the carbon dioxide source. Thus, particles of Dry Ice are introduced into water in an amount sufficient to provide a carbonated water phase having about 4.0 volumes of carbon dioxide dissolved therein. The carbonated water is then sterilized by passing the carbonated water through a microbiological filter of a size sufficient to render the carbonated water free from living microorganisms. The sterile carbonated water is then passed to the filling chamber of the aseptic canning unit and combined with a cold syrup phase in the same manner as in Example I.

EXAMPLE III

A sterile aerated beverage is prepared according to the procedure of Example I with the exception that nitrous oxide is used as the volatile edible gas. Thus, sterile nitrous oxide under pressure is sparged into sterile water to dissolve the nitrous oxide therein. The sterile water containing dissolved nitrous oxide is then passed through sterile lines to the filling chamber of the aseptic canning unit and combined with a syrup phase in the same manner as in Example I.

Repetitions of this example using dichlorodifluoromethane, tetrafluoromethane, and trifluoromethane as the volatile edible gas also produce a satisfactory product.

EXAMPLE IV

A sterile, aerated beverage is prepared having the following formulation.

| Ingredients: | Percent by weight |
| --- | --- |
| Carbohydrate (sucrose) | 11.40 |
| Stabilizer (carrageenan) | 0.14 |
| Salt (sodium citrate) | 0.20 |
| Flavor (root beer) | 0.02 |
| Colorant (caramel) | 0.37 |
| Water | 87.87 |

This beverage is prepared according to the procedure of Example I with the exception that the syrup phase contains only sugar, stabilizer, sodium citrate, flavor and colorant.

While the present invention has been particularly described in connection with the production of a sterile aerated beverage, it will be understood that the formulation of the product may be adjusted within the limits set forth hereinabove to provide a thick, relatively stiff, semi-solid product having the consistency of pudding, custard, and the like. Such a semi-solid product may be prepared according to the process described hereinabove. When such a semi-solid product is to be produced, the amount of gas dissolved in the water phase need not necessarily be sufficient to provide an effervescent product. The amount of gas dissolved in the water phase of such a semi-solid product should be at least sufficient to provide an expandable product, that is, to provide the product with an increase in volume at the time the product is to be consumed.

It will be apparent that the process of the present invention may be used in the preparation of affervescent products which contain solid, particulate matter, and is not limited to the preparation of effervescent beverages intended for human consumption. Thus, effervescent products which contain such particulate matter may be made by preparing separate phases and subsequently combining the separate phases. When such a product is not intended for human consumption, an edible gas need not be used.

It will be apparent that changes, modifications and alterations in the materials and conditions set forth hereinabove may be made by those skilled in the art. Such obvious changes, modifications and substitutions are deemed to be included within the scope of the present invention, which is limited only by the following appended claims.

What is claimed is:

1. A process for preparing a sterile effervescent beverage which comprises
preparing a sterile aerated aqueous phase by contacting a sterile, volatile, edible gas with a sterile aqueous liquid under conditions adapted to dissolve in said aqueous liquid an amount of said gas sufficient to provide an effervescent character to said beverage, maintaining said sterile aerated aqueous phase at a temperature below about 55° F.,
preparing a syrup phase having a solids content of between about 25%–75% and comprising a homogeneous mixture of carbohydrate, fat, protein, and water,
sterilizing said syrup phase,
maintaining the sterile syrup phase at a temperature no higher than that of the sterile aerated aqueous phase,
aseptically introducing said sterile aerated aqueous phase and said sterile syrup phase into a sterile container in a sterile atmosphere having a temperature below about 300° F., the amounts of said sterile aerated aqueous phase and said sterile syrup phase introduced into said container being sufficient to provide an effervescent beverage having a solids content of between about 5% and 25% by weight, and sealing said container with a sterile cover in a sterile atmosphere.

2. The process defined in claim 1 in which said sterile aerated aqueous phase is prepared by passing gaseous carbon dioxide through a microbiological ultrafilter to sterilize the gas, and injecting the sterile carbon dioxide gas into cool sterile water flowing through sterile pipes.

3. The process defined in claim 1 in which the sterile syrup phase is cooled to a temperature of about 15°–30° F. prior to introduction into said sterile containers.

4. The process defined in claim 1 in which the sterile aerated aqueous phase is introduced into the sterile containers prior to the introduction of the sterile syrup phase.

5. The process defined in claim 1 in which the syrup phase contains an amount of acid sufficient to provide the beverage with a pH of below about 6.4.

6. The process defined in claim 1 in which said sterile aerated aqueous phase is prepared by dissolving a sterile volatile edible gas selected from the group consisting of trichlorofluoromethane, dichlorodifluoromethane, chlorotrifluoromethane, tetrafluoromethane, trifluoromethane, carbon dioxide, nitrous oxide, and mixtures thereof in sterile water.

7. The process defined in claim 1 in which the sterile aerated aqueous phase is prepared by contacting sterile water, which is at a temperature of below about 60° F., with sterile carbon dioxide for a period of time sufficient to dissolve in the water at least about 4.0 volumes of carbon dioxide, and maintaining the temperature of the water below about 55° F. until it is introduced into the container.

8. The process defined in claim 1 in which the sterile syrup phase is prepared by blending carbohydrate, fat, protein, emulsifier, stabilizer and water to form a mix having a solids content of between about 25% and 75% by weight, homogenizing the mix to form an emulsion, sterilizing the emulsion and aseptically cooling the sterile emulsion to a temperature of below about 55° F.

9. The process defined in claim 1 in which the sterile aerated aqueous phase and the sterile syrup phase are filled into sterile containers in a sterile atmosphere having a temperature below about 150° F.

10. The process defined in claim 1 in which the sealed containers are agitated to disperse the syrup phase in the aqueous phase.

11. A sterile effervescent beverage consisting essentially of a homogeneous mixture having a solids content of about 5%–25% and containing from 1% to about 10% fat, from 0.2% to about 5% protein, from about 10% to about 15% carbohydrate, an amount of acid sufficient to provide said beverage with a pH of below about 6.4, and an amount of an edible volatile gas sufficient to make the beverage effervescent.

12. The beverage defined in claim 11 in which the beverage contains between 1.5 and 4.5 volumes of carbon dioxide as the edible gas.

13. The beverage defined in claim 11 in which the beverage has a solids content of between 10% and 20% by weight.

14. The product defined in claim 11 in which said volatile edible gas is selected from the group consisting of trichlorofluoromethane, dichlorodifluoromethane, carbon dioxide, nitrous oxide and mixtures thereof.

References Cited

UNITED STATES PATENTS

| | | | |
|---|---|---|---|
| 3,503,757 | 3/1970 | Rubenstein | 426—359 |
| 2,639,591 | 5/1953 | Mojonnier | 222—146 C |
| 2,685,520 | 8/1954 | Martin | 426—399 |
| 3,385,714 | 5/1968 | Smith | 426—190 |
| 2,988,450 | 6/1961 | Bulatkin | 426—399 |
| 2,977,231 | 3/1961 | Fox et al. | 426—394 X |
| 3,084,052 | 4/1963 | McLauglin | 426—399 X |
| 3,773,961 | 11/1973 | Gordon | 426—364 X |
| 3,684,523 | 8/1972 | McGinley et al. | 426—189 X |

OTHER REFERENCES

Jacobs: *Carbonated Beverages*, 1959, pp. 26–43, 89–97, 199–207, 214–230.

S. LEON BASHORE, Primary Examiner

A. L. CORBIN, Assistant Examiner

U.S. Cl. X.R.

426—363, 364, 365, 399, 477